Figure 1:
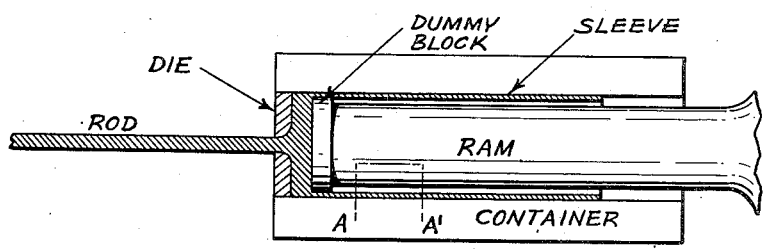

Dec. 11, 1956  W. F. SCHMOLLINGER  2,773,593
METHODS OF EXTRUDING HIGH COPPER ALLOYS
Filed Feb. 27, 1953

INVENTOR
WILLIAM F. SCHMOLLINGER
BY Steward & Steward
his ATTORNEYS

United States Patent Office 2,773,593
Patented Dec. 11, 1956

2,773,593

METHODS OF EXTRUDING HIGH COPPER ALLOYS

William F. Schmollinger, North Woodbury, Conn., assignor to Chase Brass & Copper Co. Incorporated, Waterbury, Conn., a corporation of Connecticut Application February 27, 1953, Serial No. 339,331

8 Claims. (Cl. 207—10)

This invention relates to methods of extruding high copper alloys; and it relates more particularly to a method of extruding such alloys for the production of rods and tubes in such manner as positively to ensure that the skin or thin outer layer of the original alloy billet is caused to remain, as a sleeve, in intimate contact with the wall of the billet-container of the extrusion press at all times throughout the extruding operation. By reason of its thus adhering or sticking to the container wall, the sleeve is restrained from sliding forward and being extruded along with the core metal of the billet; while, on the other hand the core metal itself is free to slip within the sleeve and flow out through the die under the action of the press ram. This results in eliminating the sub-surface pipe, or at least greatly reducing the amount thereof, heretofore characterizing rods and tubes extruded from billets of such alloys and rendering it necessary to scalp the extruded rods or tubes and also to subject them to further relatively complex and expensive treatment in order to produce a satisfactory finished product.

The designation "high-copper alloys" is to be understood as applying to copper-base alloys containing at least about 85 percent copper.

In extruding high-copper alloys heretofore, the long-established practice has been to extrude without a sleeve due to the fact that prior attempts to extrude with a sleeve were not successful, the extruded rods or tubes being still characterized by sub-surface pipe and like surface imperfections requiring that the extruded products be scalped. It appears probable that the inability heretofore to successfully sleeve these alloys is due to the surface layer of the hot billet or blank in contact with the wall of the billet container of the extrusion press sliding forward ahead of the dummy block in the extruding operation, even though the diameter of this block or disk is sufficiently less than the inside diameter of the container to provide for sleeve formation so that the surface or skin of the billet is extruded along with the core through the die and appears on or just below the surface of the extruded product. Because of this inability to get rid of sub-surface pipe, a relatively large number of specific and distinct fabricating operations have been heretofore unavoidably involved in producing round (e. g.) high-copper rods or tubes of desired final smaller diameter than the initially extruded product. In the first place, it was necessary initially to extrude the product greatly over-size in respect to diameter. After scalping as before noted, and thereby producing a considerable amount of scrap, the scalped product had then to be rolled to smaller size in two rolling operations, each followed by annealing, then pointed and drawn in successive stages, to final size and straightened, in order to produce a commercially acceptable final product that would pass properly careful inspection. Besides entailing further loss of material as scrap, these successive numerous fabricating steps naturally rendered the manufacture of such rod and tube products complex and costly in respect to both material and labor.

It is accordingly a primary object of the present invention to eliminate the formation of pipe in extruding high-copper alloys for production of rods and tubes.

Further and more specific objects of the invention are to eliminate the scalping operation heretofore unavoidable, as well as the resultant scalping scrap, or at least to do so in large degree; to enable extruding high-copper alloy rods and tubes at temper size, with the result that all breakdown and annealing operations heretofore necessarily preceding reduction of the extruded product to temper size can be eliminated; to effect substantial reduction in the amount of over-all scrap produced, as compared to prior practice; as well as to obtain a finished extrusion product of improved quality.

Still another object of the invention is to accomplish the foregoing desirable results in a relatively simple manner and substantially without departure from prior practice so far as concerns plant equipment necessary to employ.

In order to make clear the principles of the present invention, whereby the above-mentioned objects and advantages, as well as others, may be achieved and realized, a detailed description of a practical embodiment of the invention will be given by way of illustrative example.

In accordance with the principles of the invention, the surface of the billet of high-copper alloy to be extruded is so treated, before heating it to extruding temperature, that when the hot billet is placed in the extrusion press container and initially expanded or upset against the container wall by operation of the ram in the usual manner, the friction or resistance to relative movement between the two contacting surfaces is materially enhanced over what it would be had the billet not been so treated. This friction is so much greater, in fact, that the sleeve formed in the subsequent actual extruding operation remains behind at the end of the extruding operation as a "full sleeve" adhering to the container wall, instead of being extruded through the die along with the core. This sleeve may be removed from the container in well known manner, in readying the container to receive the next billet to be extruded.

The pre-conditioning of the billet surface to increase its coefficient of friction to the necessary extent may evidently be accomplished in various ways. One way that has been found effective in extruding tellurium copper (about 0.5% Te), for example, is to provide the billet with a coating of frictional material that will adhere to the billet surface sufficiently well during the heating up of the billet to extruding temperature and during the ensuing extrusion. It is important that the material be of a refractory nature since, of course, it must be able to withstand without destruction the maximum operating temperature involved which, while capable of variation, is typically on the order of about 1400° F. when extruding tellurium copper. The coating of material remaining on the billet after it has been heated to extruding temperature should of course be as free as practicable of lubricating or friction-reducing components. In this connection, since oxidation of the surface of the billet commonly occurs during the preheating of the billet, and since the resultant layer of oxide appears to act as a lubricant during extrusion, thereby having a tendency to permit surface defects in the billet as well as the oxide itself to slide forward during the extrusion and eventually appear at or just below the surface of the extruded rod, the present invention in its most desirable embodiment includes taking care to minimize such oxidation. This can be done in several ways. Thus, the friction-enhancing coating itself may be and most desirably is of such character as to shield the billet against substantial surface oxidation even if the atmosphere of the heating furnace is more or less oxidizing. In addition, the said atmosphere may be maintained neutral or even reducing in character, if desired, in a manner well understood in the art.

In practicing the invention, it has been found that a particularly satisfactory way of providing the billet with an effective friction coating, while at the same time guarding against undue surface oxidation, is first to paint the billet, before preheating, with a cold water paint of ordinary type comprising essentially a suspension of finely divided calcium carbonate in water containing a water-soluble glue. The billet is then dried, the resultant dried coating adhering well to its surface. During the ensuing heating to extrusion temperature there is little or no flaking off of the coating. Thus, at the end of this operation, the billet is coated with an adequately adherent calcareous coating which has a high coefficient of friction at the extrusion temperature. Obviously, the desired type of friction coating is obtainable by using any other refractory material having a sufficiently high coefficient of friction under the prevailing operating conditions, and the desired coating thereof may be formed upon the surface of the billet in any suitable manner, whether by initially applying it in the form of a paint or otherwise.

Figure 2:
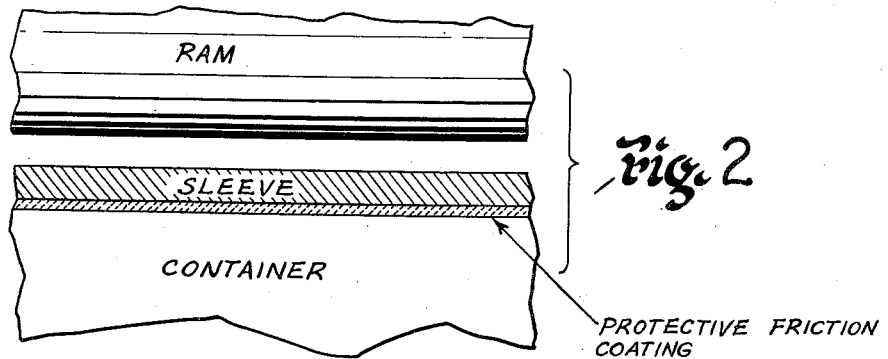

The accompanying drawings illustrate more or less diagrammatically the essential features of the configuration or distribution of the billet metal at a stage of operation toward the end of the extrusion stroke when a billet of tellurium copper, for example, provided with a friction coating in accordance with the invention, is being extruded to produce rod. In these drawings, Fig. 1 is a central longitudinal section through the billet container or receiver of an extrusion press, within which works a ram, together with a dummy block of suitably smaller diameter than the container interposed between the ram and the billet to be extruded; while Fig. 2 is a fragmentary section, on an enlarged scale, on the line A—A' of Fig. 1. This general type of extrusion equipment is well known, of course, having been extensively used in hot extrusion procedures not involving, however, making provision for preventing movement of such sleeve or part sleeve as might be formed relative to the container wall. As is evident from the legends on these drawings, provision of the protective friction coating on the billet in accordance with the invention enables extrusion of the high-copper alloy with full sleeve, thus overcoming serious difficulties heretofore encountered in extruding such alloys and enabling realization of the before mentioned advantages. That is, since the sleeve formed is prevented from movement relative to the container wall by the action of the interposed protective coating of refractory friction material, the sleeve remains in place on said wall and only the core metal originally enclosed within the sleeve is extruded through the die, yielding an extrusion product free or substantially free of the surface or skin of the billet and hence so free of serious surface imperfections that it can be finished without scalping.

Some idea of the extent and importance of these advantages thus now practically realizable by reason of the novel method of the invention can be gained from the comparison, given below, of the flow sheets or series of specific operations involved in the production of ⅝-inch diameter round tellurium copper rod by the new method and by the old standard method, respectively.

*Method #1—coated billets:*

(1) Coat billets
(2) Extrude 0.760"
(3) Point
(4) Draw to 0.625"
(5) Straighten
(6) Inspect

*Method #2—old procedure:*

(1) Extrude 1.687"
(2) Scalp 1.525"
(3) Rod roll 1.160"
(4) Anneal
(5) Rod roll 0.850"
(6) Anneal
(7) Point
(8) Draw 0.760"
(9) Anneal
(10) Point
(11) Draw 0.625"
(12) Straighten
(13) Inspect Viewed from the standpoint of radically cutting down the number of operations heretofore required, the foregoing comparison shows the great simplification and saving made possible by the present invention. But, in addition, there is realized in actual practice a large total scrap reduction as compared to prior practice, both because of the elimination of scalping scrap in this instance and also because of the great reduction in the number of mill operations heretofore required to produce small sizes. In prior practice, high-copper alloy rod extruded under exactly the same conditions save for the use, as herein disclosed, of an adherent coating of heat-refractory friction material on the billet undergoing extrusion, was invariably characterized by serious surface imperfections which caused scalping and other fabricating operations thereby necessitated to be regular routine practice recognized as unavoidable. Frequently those surface imperfections were so gross as to give the extruded rod a "shagbark" appearance.

In another specific example, billets of tellurium copper are first brushed to remove any loose foreign material, such as sand, dirt or dust that may have accumulated during storage. The billets are then painted with a cold water paint, the paint being applied to both ends as well as the cylindrical surfaces. The billets, after being dried and preheated to extrusion temperature, are then processed as follows:

Extrude 1.687" 3-hole die
Draw 1.400"
Anneal
Draw 1.125"
Medart straighten
Inspect Upon final inspection, a few out of many pieces may be rejected for sub-surface defects (sub-surface pipe), sometimes resulting in as much as 6 or 7 percent scrap. This compares, however, with the 17% scalping scrap normally to be expected in prior practice when producing the same product from the same alloy.

Other high-copper alloys which, like tellurium copper, usually have a relatively poor as-cast surface give results which represent improvement over prior practice with regard to elimination of surface pipe, when extruded in accordance with the present invention. However, for some reason not yet clearly apparent, the improvement, although substantial, is in general less marked than in the case of tellurium copper. Among other such high-copper alloys may be mentioned, for example, those known in the industry by the commercial designations Phosnic Bronze, Leaded Commercial Bronze, and Telnic Bronze, the compositions and other essential characteristics of which are well known to the trade.

Among the elements commonly alloyed with copper in so-called high-copper alloys are tellurium, selenium, nickel, phosphorus, zinc, tin, lead, chromium, cadmium, and sometimes others, these being used singly or in various combinations.

What is claimed is:

1. The method of extruding high-copper alloy rod or tube at relatively high temperatures which comprises providing a high-copper alloy billet with a coating of high-temperature refractory material adapted to increase friction between the surface of the billet and the wall of the extrusion press container, and extruding the core of the coated billet at suitably elevated temperature from such container through a die while leaving substantially a full sleeve on the container wall.

2. The method of extruding high-copper alloys set forth in claim 1, wherein the alloy extruded is tellurium copper.

3. The method of extruding high-copper alloys set forth in claim 1, which includes painting the billet with a mixture of such refractory friction material and a liquid carrier medium, drying the painted billet, heating it to extrusion temperature, and extruding the hot billet.

4. The method set forth in claim 3, wherein said mixture includes an adhesive.

5. The method set forth in claim 4, wherein said mixture is a cold water paint.

6. The method set forth in claim 1, wherein the alloy is extruded on temper size and the extruded product is then, without scalping, reduced to final desired size.

7. The method set forth in claim 6, wherein the extruded product is, without scalping and without rolling, drawn to final desired size.

8. The method set forth in claim 7, wherein the alloy extruded is tellurium copper.

References Cited in the file of this patent
UNITED STATES PATENTS

| | | |
|---|---|---|
| 1,955,243 | Liebergeld et al. | Apr. 17, 1934 |
| 2,112,632 | Montgomery | Mar. 29, 1938 |
| 2,165,711 | Kreidler | July 11, 1939 |
| 2,260,914 | McGar | Oct. 28, 1941 |

OTHER REFERENCES

Steel, pgs. 102–104 and 116, Oct. 21, 1946, Use of Adhesives.

The Rolling Mill Journal, pages 479–482 and pages 494–495, July, 1931.

The Extrusion of Metals.